(12) United States Patent
Altaf et al.

(10) Patent No.: US 12,019,612 B2
(45) Date of Patent: Jun. 25, 2024

(54) DATA MATURITY MANAGEMENT

(71) Applicant: International Business Machines Corporation, Armonk, NY (US)

(72) Inventors: Naeem Altaf, Round Rock, TX (US); Hari H. Madduri, Austin, TX (US); Leucir Marin, Jr., Cedar Park, TX (US); Maharaj Mukherjee, Poughkeepsie, NY (US); Joanna W. Ng, Unionville (CA); Michael P. Robertson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 15/442,966

(22) Filed: Feb. 27, 2017

(65) Prior Publication Data

US 2018/0246924 A1    Aug. 30, 2018

(51) Int. Cl.
*G06F 16/20* (2019.01)
*G06F 16/215* (2019.01)
*G06F 16/23* (2019.01)
*G06F 16/2457* (2019.01)

(52) U.S. Cl.
CPC ........ *G06F 16/2365* (2019.01); *G06F 16/215* (2019.01); *G06F 16/24578* (2019.01)

(58) Field of Classification Search
CPC .............. G06F 16/2365; G06F 16/215; G06F 16/24578
See application file for complete search history.

(56) References Cited

U.S. PATENT DOCUMENTS

| 8,600,976 | B2  | 12/2013 | Cradick et al. |
| 8,676,721 | B2  | 3/2014  | Piovesan et al. |
| 8,688,487 | B2* | 4/2014  | Veeningen .............. E21B 43/00 705/7.11 |
| 9,218,324 | B2  | 12/2015 | Boyer et al. |
| 2013/0304431 | A1 | 11/2013 | Kannegala et al. |
| 2015/0039672 | A1 | 2/2015  | Hussain et al. |
| 2015/0067108 | A1 | 3/2015  | Mamidwar et al. |

(Continued)

FOREIGN PATENT DOCUMENTS

CN    103686717 A  *  3/2014

OTHER PUBLICATIONS

IBM, List of IBM Patents or Patent Applications Treated as Related, Appendix P, dated Dec. 22, 2017, 2 pages.

(Continued)

*Primary Examiner* — Tarek Chbouki
*Assistant Examiner* — Loan T Nguyen
(74) *Attorney, Agent, or Firm* — Tihon Poltavets

(57) ABSTRACT

Disclosed aspects relate to Internet of Things (IoT) data maturity management. A set of IoT data may be ingested by a data maturity engine. A set of maturity factors which indicates a fitness for utilization of the set of IoT data may be determined. The determining may occur with respect to the set of IoT data by the data maturity engine. A data management operation may be identified by the data maturity engine based on the set of maturity factors for the set of IoT data. The data management operation may be identified to manage the set of IoT data. The data management operation may be carried-out to manage the set of IoT data.

18 Claims, 10 Drawing Sheets

(56) References Cited

U.S. PATENT DOCUMENTS

| | | | |
|---|---|---|---|
| 2015/0169666 A1* | 6/2015 | Mandelstein | G06F 16/215 |
| | | | 707/691 |
| 2016/0092495 A1* | 3/2016 | Dietterich | G06F 16/215 |
| | | | 707/692 |
| 2016/0195857 A1* | 7/2016 | Gandhi | G05B 13/041 |
| | | | 700/31 |
| 2016/0195957 A1 | 7/2016 | Reynolds | |
| 2016/0217419 A1* | 7/2016 | Majumdar | G06Q 10/06 |
| 2016/0350361 A1* | 12/2016 | Chen | G06F 16/24578 |
| 2017/0006135 A1* | 1/2017 | Siebel | H04L 67/34 |
| 2017/0103330 A1* | 4/2017 | Gagne | G06F 11/079 |
| 2018/0174671 A1 | 6/2018 | Cruz Huertas | |

OTHER PUBLICATIONS

Pending U.S. Appl. No. 15/831,814, filed Dec. 5, 17, entitled: "Data Maturity Management", 71 pages.

\* cited by examiner

DATA MATURITY MANAGEMENT

BACKGROUND

This disclosure relates generally to computer systems and, more particularly, relates to data maturity management. The amount of data that needs to be managed by enterprises is increasing. The maturity of Internet of Things adds to the amount of data needed to be managed. Management of data may be desired to be performed as efficiently as possible. As data needing to be managed increases, the need for data maturity management—pertaining to mature and valid data, determined by a set of factors, and associated with data management efficiency, relevance, and accuracy—may increase as a result.

SUMMARY

Data maturity has a positive correlation to data management efficiency, relevance, and accuracy. This is especially the case, for example, for managing the massive data coming from the Internet of Things (IoT). This disclosure describes aspects related to the evaluation of data maturity using metadata received from IoT devices. The metadata may be dynamically analyzed to validate the maturity of a set of data. Such dynamic analysis can include but is not limited to evaluation elements such as timestamps for the set of data, frequency of data arrival, source reputation, the intended use of the data, expected expiration time, dependency relations, and other contextual information may be used to assess the integrity of the set of data and determine an evaluation of the maturity of the set of data. The maturity of the set of data may be evaluated on an individual basis for different IoT devices. The evaluation of the maturity of the set of data may indicate a calculated/predicted time when the set of data may become mature. Based on the evaluation of the maturity of the set of data, a data management operation may be performed to manage the set of IoT data. For instance, the data management operation may include discarding, temporarily storing, or immediately processing all or a portion of the set of data.

Disclosed aspects relate to Internet of Things (IoT) data maturity management. A set of IoT data may be ingested by a data maturity engine. A set of maturity factors which indicates a fitness for utilization of the set of IoT data may be determined. The determining may occur with respect to the set of IoT data by the data maturity engine. A data management operation may be identified by the data maturity engine based on the set of maturity factors for the set of IoT data. The data management operation may be identified to manage the set of IoT data. The data management operation may be carried-out to manage the set of IoT data.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
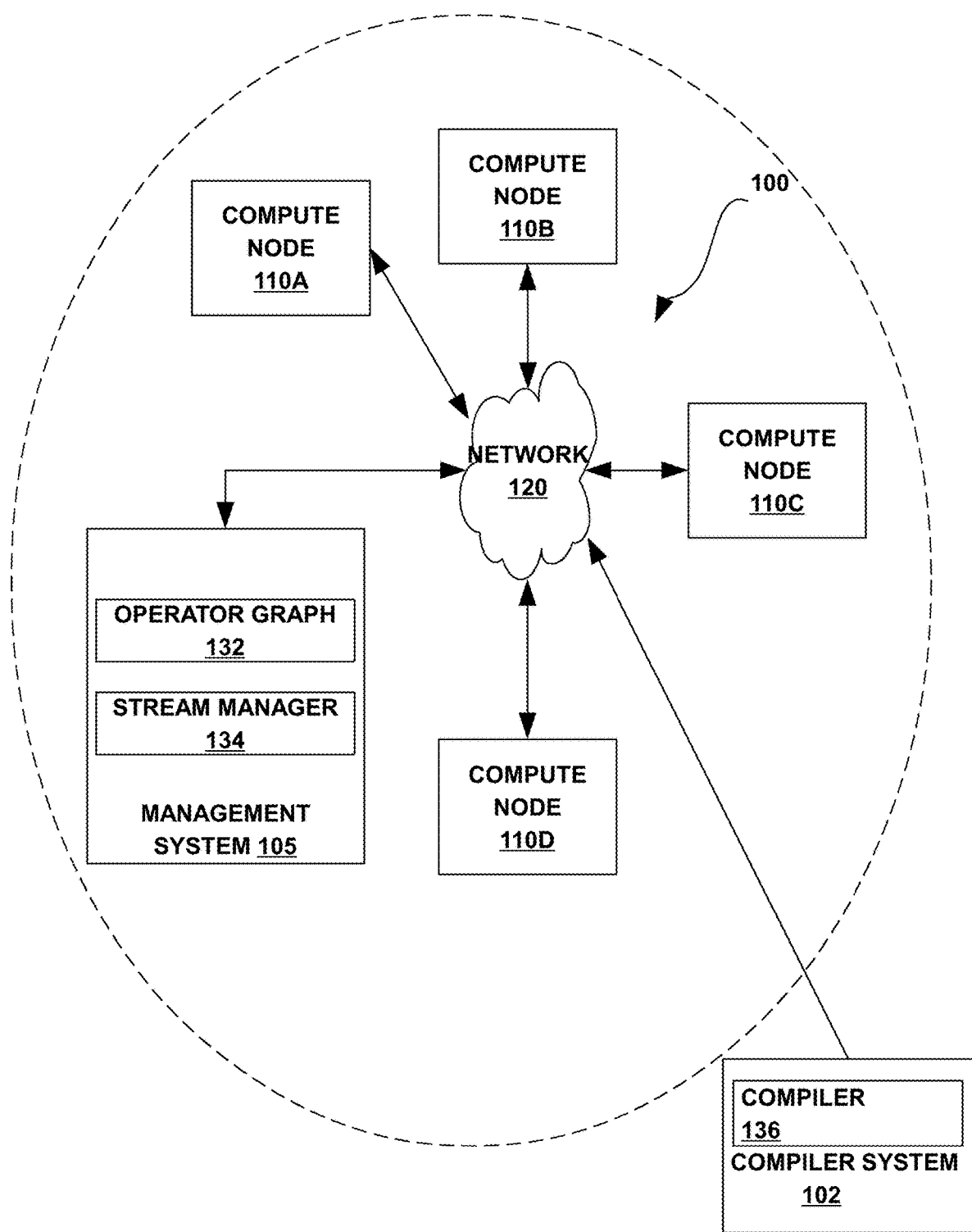
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to Internet of Things (IoT) data maturity management. Metadata received from IoT devices may be dynamically analyzed to validate the maturity (e.g., validity, utility) of a set of data. Factors such as timestamps for the set of data, frequency of data arrival, source reputation (e.g., trustworthiness of the device/sensor), the intended use of the data, expected expiration time, dependency relations, and other contextual information may be used to assess the integrity of the set of data and determine an evaluation of the maturity of the set of data. The maturity of the set of data may be evaluated on an individual basis for different IoT devices (e.g., data from particular IoT devices may mature at a faster or slower rate than data from other IoT devices). The evaluation of the maturity of the set of data may indicate a calculated/predicted time when the set of data may become mature. Based on the evaluation of the maturity of the set of data, a data management operation may be performed to manage the set of IoT data. For instance, the data management operation may include discarding, temporarily storing, or immediately processing all or a portion of the set of data. Leveraging maturity information for a set of data received from IoT devices may be associated with benefits such as data reliability, data utility, and IoT network performance and efficiency.

The use of an Internet-of-Things (IoT) network may be used to facilitate integration and inter-networking among physical devices. A variety of IoT devices may be used to collect data and transmit it to target applications or computing modules for processing and analysis. Aspects of the disclosure relate to the recognition that, in some situations, data collected and relayed by an IoT device may not be mature (e.g., valid, reliable) the moment it is received. For instance, an individual temperature measurement by a single sensor may not be representative of the average running temperature of a computing device. Accordingly, aspects of the disclosure relate to using metadata pertaining to a set of IoT data to validate the maturity of the set of IoT data. Based on the maturity of the set of IoT data, one or more data management operations to manage the set of IoT data may be identified and carried out. As such, utilization of maturity information may facilitate IoT data accuracy, integrity, and effectiveness.

Aspects of the disclosure relate to a system, method, and computer program product of Internet of Things (IoT) data maturity management. A set of IoT data may be ingested by a data maturity engine. A set of maturity factors which indicates a fitness for utilization of the set of IoT data may be determined. The determining may occur with respect to the set of IoT data by the data maturity engine. A data management operation may be identified by the data maturity engine based on the set of maturity factors for the set of IoT data. The data management operation may be identified to manage the set of IoT data. The data management operation may be carried-out to manage the set of IoT data.

In embodiments, the set of IoT data may be organized based on the set of maturity factors and routed to the data processing engine. In embodiments, a set of IoT data elements may be calculated with respect to the set of IoT data based on the set of maturity factors and the set of IoT data elements may be routed to the data processing engine. In embodiments, a first subset of the set of IoT data may be disregarded based on the set of maturity factors and a second subset of the set of IoT data may be routed to the data processing engine. In embodiments, the set of IoT data may be prevented from being routed to the data processing engine based on both a staging threshold and the set of maturity factors, and the set of IoT data may be routed to the data processing engine in response to achievement of the staging threshold by the set of maturity factors. In embodiments, one or more of a temporal maturity factor feature, a data expiration maturity factor feature, an expected future maturity expectation feature, a frequency of data reception maturity factor feature, a source reputation maturity factor feature, a consistency maturity factor feature, a comparative context maturity factor feature, a security level maturity factor feature, an intended utilization maturity factor feature, or a dependency maturity factor feature may be ascertained with respect to the set of IoT data by the data maturity engine and used to select a data management operation to manage the set of IoT data. Altogether, aspects of the disclosure can have performance or efficiency benefits. Aspects may save resources such as bandwidth, disk, processing, or memory.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
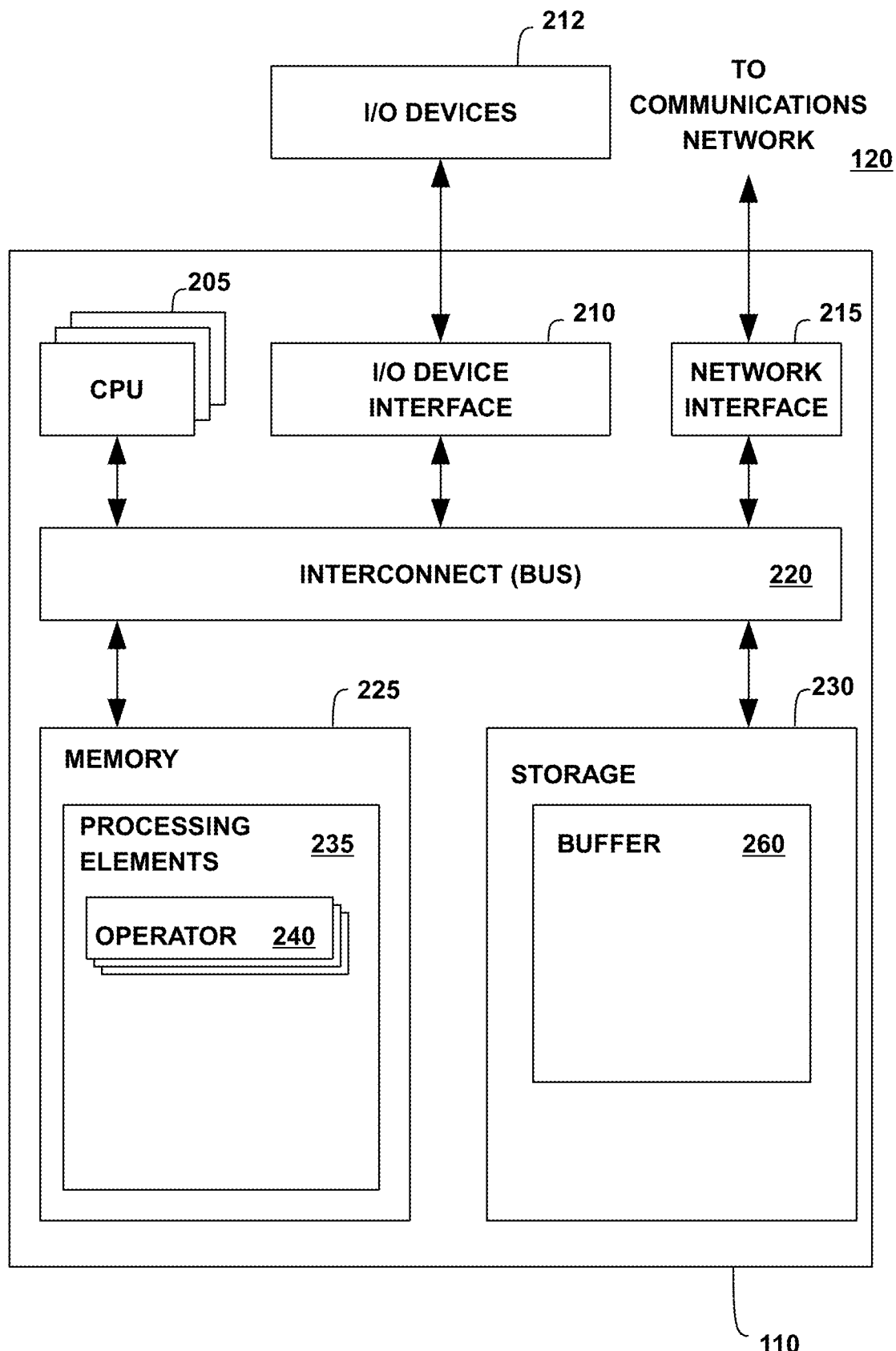
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
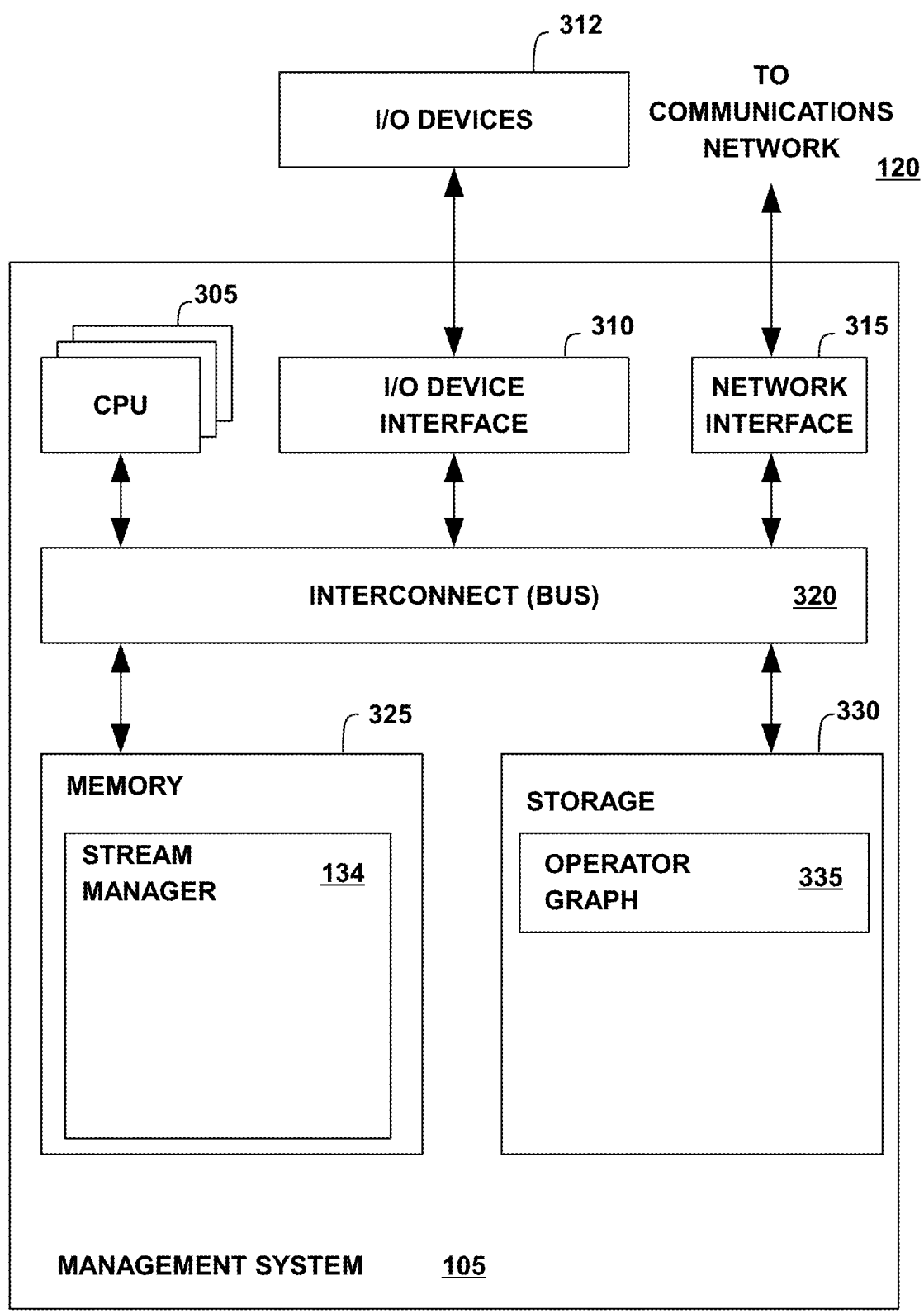
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
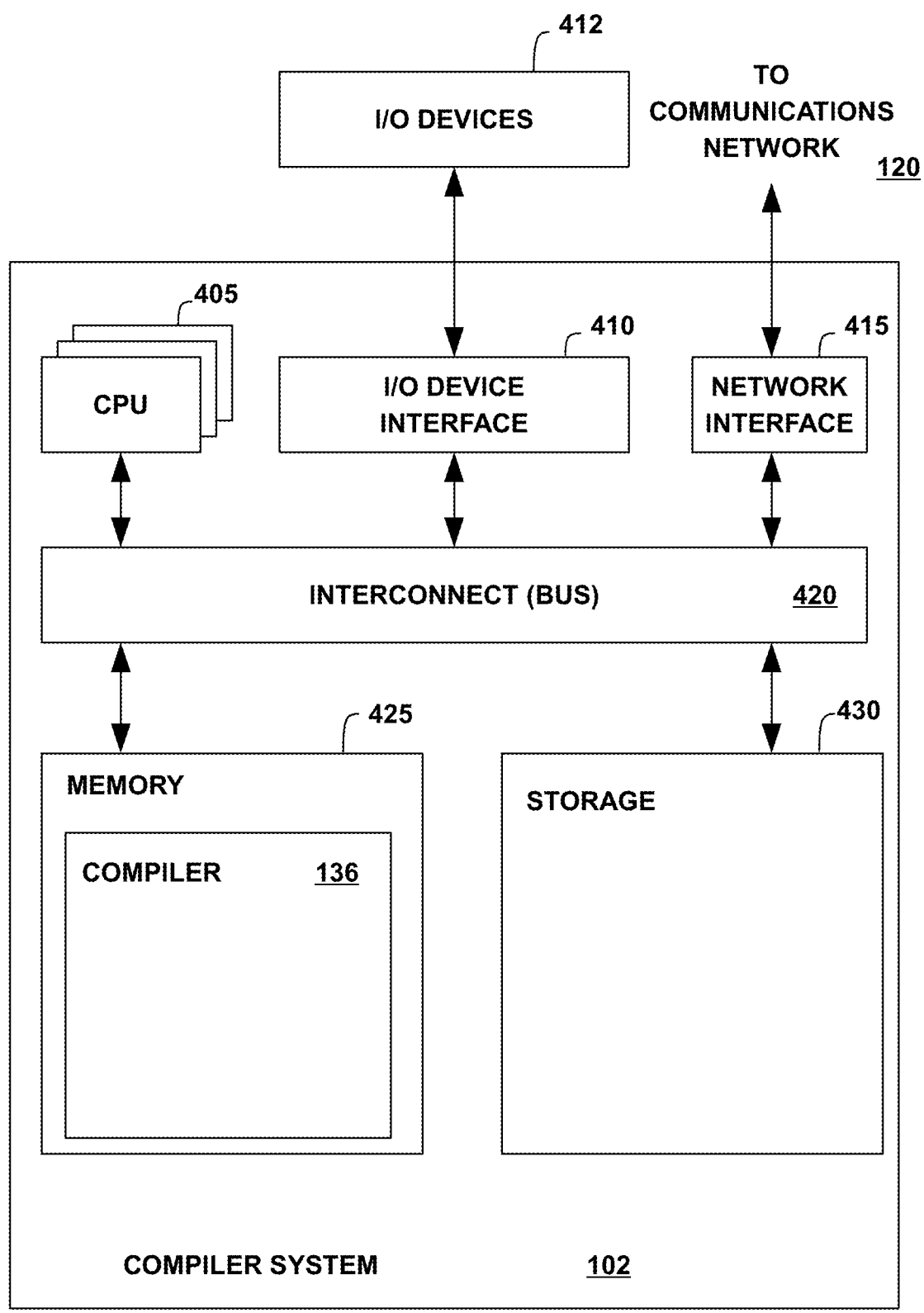
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
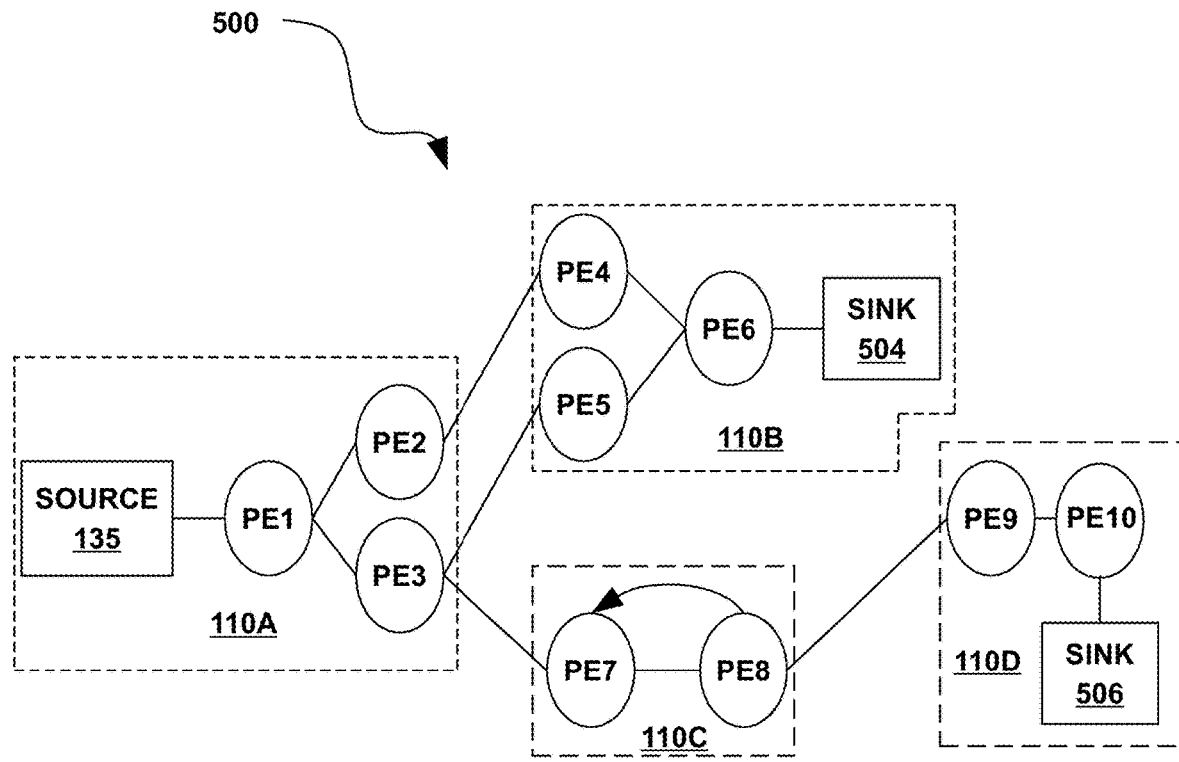
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2)

within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
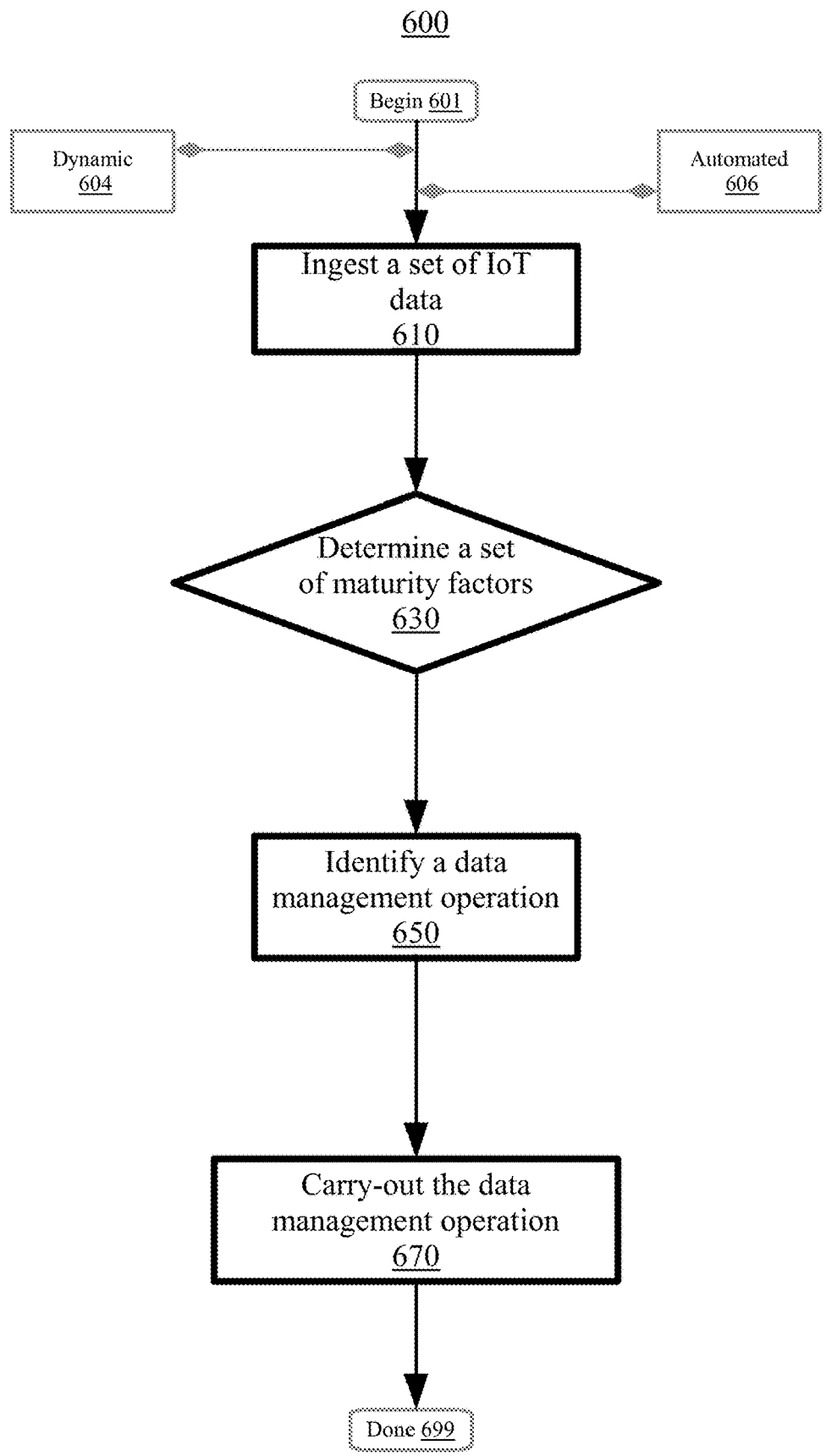
FIG. 6 is a flowchart illustrating a method of IoT data maturity management, according to embodiments.

FIG. 6 is a flowchart illustrating a method 600 of IoT data maturity management, according to embodiments. Aspects of the method 600 relate to identifying and carrying-out a data management operation to manage a set of IoT data based on a set of maturity factors for a set of IoT data captured in an IoT environment. The IoT environment may include a network of interconnected sensors, devices, vehicles, buildings, and other items to facilitate data collection, communication, and connectivity. The IoT environment may include applications such as environment monitoring, infrastructure management, manufacturing, media, energy management, medical/healthcare, building/home automation, transportation, metropolitan scale developments, consumer applications, and the like. Aspects of the disclosure relate to the recognition that, in some situations, data collected and relayed by an IoT device in an IoT environment may not be mature (e.g., valid, reliable) the moment it is received. For instance, an individual temperature measurement by a single sensor may not be representative of the average running temperature of a computing device. Accordingly, aspects of the disclosure relate to using metadata pertaining to a set of IoT data to validate the maturity of the set of IoT data. Altogether, leveraging maturity information for a set of data received from IoT devices may be associated with benefits such as data reliability, data utility, and IoT network performance and efficiency. The method 600 may begin at block 601.

In embodiments, the ingesting, the determining, the identifying, the carrying-out, and the other steps described herein may each be executed in a dynamic fashion at block 604. The steps described herein may be executed in a dynamic fashion to streamline IoT data maturity management. For instance, the ingesting, the determining, the identifying, the carrying-out, and the other steps described herein may occur in real-time, ongoing, or on-the-fly. As an example, one or more steps described herein may be performed in real-time (e.g., a data management operation to manage the set of IoT data may be identified and carried-out on-the-fly based on a set of maturity factors for ingested IoT data) in order to streamline (e.g., facilitate, promote, enhance) IoT data maturity management. Other methods of performing the steps described herein are also possible.

In embodiments, the ingesting, the determining, the identifying, the carrying-out, and the other steps described herein may each be executed in an automated fashion at block 606. The steps described herein may be executed in an automated fashion without user intervention. In embodiments, the ingesting, the determining, the identifying, the carrying-out, and the other steps described herein may be carried out by an internal IoT data maturity management module maintained in a persistent storage device of a local computing device (e.g., network node). In embodiments, the ingesting, the determining, the identifying, the carrying-out, and the other steps described herein may be carried out by an external IoT data maturity management module hosted by a remote computing device or server (e.g., server accessible via a subscription, usage-based, or other service model). In this way, aspects of IoT data maturity management may be performed using automated computing machinery without manual action. Other methods of performing the steps described herein are also possible.

At block 610, a set of IoT data may be ingested. The ingesting may be performed by a data maturity engine. Generally, ingesting can include detecting, analyzing, sensing, receiving, collecting, gathering, transforming, importing, or otherwise capturing the set of IoT data by the data maturity engine. The set of IoT data may include a collection of structured or unstructured information collected by IoT devices (e.g., sensors) of the IoT environment. The set of IoT data may include textual data (e.g., reports), image data (e.g., captured photographs), audio data (e.g., sound recordings), video data (e.g., video recordings), biometric data (e.g., heart rate, mental state) or other media to indicate the status (e.g., temperature measurements, resource usage diagnostics), location (e.g., absolute or relative indication of the geographic/spatial location of an entity), automated processes (e.g., tasks, operations, procedures that are queued for automated performance), actionable items (e.g., parameter states or conditions that trigger manual or automated events) or other aspects of an IoT environment. The set of IoT data may include passive data (e.g., data from sensors that collect data only when instructed), active data (e.g., sensors configured to continuously collect and transmit data), or dynamic data (e.g., bidirectional communication between sensor devices and software applications). For instance, the set of IoT data may include dynamic measurements of the density of particulates in an air volume of a specified area. In embodiments, ingesting may include using a plurality of sensors (e.g., cameras, microphones, thermal cameras, motion sensors, thermometers, photodetectors, barometers, hydrometers, capacitance sensors, accelerometers) to aggregate (e.g., collect, capture) the set of IoT data from an environment (e.g., home environment, health care facility, factory, office building, road/highway), and transmit it to the data maturity engine. The data maturity engine may include a hardware component or software module configured to analyze, evaluate, or otherwise validate the degree of maturity of the set of IoT data. In certain embodiments, the data maturity engine may be hosted by a central computing device that is communicatively connected with the set of IoT devices. In certain embodiments, each IoT device of the IoT environment may be equipped with a data maturity engine to facilitate flexibility and independent processing with respect to the set of IoT data. In embodiments, ingesting the set of IoT data may include configuring the set of IoT devices to push (e.g., automatically relay) the set of IoT data to the data maturity engine in a continuous or ongoing fashion. In embodiments, ingesting the set of IoT data may include configuring the data maturity engine to dynamically pull (e.g., request) the set of IoT data from the set of IoT devices. As an example, ingesting the set of IoT data may include using a thermometer to collect temperature data, a barometer to collect air pressure data, and a humidity sensor to collect humidity data for a battery manufacturing facility, and relaying the data in real-time to a data maturity engine to dynamically monitor for irregularities in battery production (e.g., changes to temperature, humidity, or pressure that may negatively impact battery yield). Other methods of ingesting the set of IoT data by the data maturity engine are also possible.

At block 630, a set of maturity factors may be determined. The determining may occur with respect to the set of IoT data by the data maturity engine. The set of maturity factors may indicate a fitness for utilization of the set of IoT data by a data processing engine. Generally, determining can include computing, formulating, detecting, calculating, resolving, identifying, or otherwise ascertaining the set of maturity factors which indicate the fitness for utilization of the set of IoT data. The set of maturity factors may include a qualitative or quantitative indication of the validity, quality, integrity, reliability, or readiness of the set of IoT data (e.g., for processing or utilization). In embodiments, the set of maturity factors may include a qualitative label, marker, or identifier of the maturity of a set of IoT data (e.g., labels such as "mature," "immature," and "overly-mature/expired"). In embodiments, the set of maturity factors may be expressed as a percentage, where a maturity factor of "100%" for a set of IoT data indicates complete maturity (e.g., ripeness, ready for processing/utilization), percentages less than 100% indicate that the set of IoT data is not yet mature (e.g., not yet ripe), and percentages greater than 100% indicate that the set of IoT data is overly mature (e.g., overripe, expired, past the point of utility). In embodiments, determining the set of maturity factors may include evaluating the set of IoT data with respect to a set of maturity criteria. The set of maturity criteria may include a collection of parameters, characteristics, conditions, requirements, stipulations, or benchmarks to assess the degree of maturity of the set of IoT data. For instance, the set of maturity criteria may include parameters such as the time since the set of IoT data was collected, the IoT device from which the set of IoT data was received, the amount of IoT data already ingested, the frequency with which the set of IoT data is received, contextual factors for the set of IoT data, and the like. In embodiments, the set of maturity criteria may be structured based on the nature of the set of IoT data (e.g., different types of IoT data have different standards/benchmarks for defining maturity). For instance, the set of maturity criteria may differ based on the intended use of the set of IoT data, historical usage patterns for the set of IoT data, the amount of IoT data, or the like. As an example, consider that a data maturity engine is configured to monitor a set of IoT sensors to determine early indications of weather phenomena (e.g., storms, rain, snow, hail). In embodiments, a particular IoT sensor may collect a set of IoT data that indicates a humidity measurement above a threshold humidity level (e.g., an early sign of potential rainfall). As such, the data maturity engine may be configured to compare the set of IoT data with respect to the set of maturity criteria, and determine a maturity factor of "36%" for the set of IoT data (e.g., a single measurement of increased humidity is not necessarily representative of impending precipitation). Other methods of determining the set of maturity factors to indicate a fitness for utilization of the set of IoT data are also possible.

At block 650, a data management operation may be identified. The identifying may be performed by the data maturity engine based on the set of maturity factors for the set of IoT data. The identifying may occur to manage the set of IoT data. Generally, identifying can include detecting, discovering, discovering, recognizing, distinguishing, or otherwise ascertaining the data management operation to manage the set of IoT data. The data management operation may include an action, process, procedure, policy, activity, or behavior to facilitate appropriate utilization of the set of IoT data. For instance, the data management operation may include disregarding the set of IoT data (e.g., ignoring data that is not mature or expired), temporarily storing the set of IoT data (e.g., waiting until the data becomes mature), or immediately processing the set of IoT data (e.g., utilizing data that is mature). In embodiments, identifying the data management operation may include comparing the set of maturity factors for the set of IoT data with respect to a rubric of established IoT data management protocols that map a series of data management operations to particular maturity factors of the set of maturity factors. For instance, the rubric of established IoT data management protocols may indicate that sets of IoT data associated with maturity factors below 50% or above 100% be discarded, sets of IoT data associated with maturity factors between 51 and 90% be temporarily stored (e.g., for a predefined time period, until a threshold amount of data is collected), and sets of IoT data associated with maturity factors between 91% and 100% be immediately processed. In embodiments, determining the data management operation may include analyzing a log of archived IoT data management operations to ascertain a particular data management operation that is associated with a success rate above a threshold with respect to a particular type of IoT data, and selecting the particular data management operation for performance. As an example, in response to ascertaining (e.g., based on the log of archived IoT data management operations) that a data management operation of "Temporary storage until 200 measurements are collected" is associated with a success rate above a threshold with respect to IoT data related to "groundwater saturation levels," the same data management operation of "Temporary storage until 200 measurements are collected" may be selected for implementation with respect to a set of IoT data related to groundwater saturation levels that has not yet achieved maturity. Other methods of identifying the data management operation to manage the set of IoT data are also possible.

At block 670, the data management operation may be carried-out. The carrying-out may be performed by the data maturity engine. The carrying-out may occur to manage the set of IoT data. Generally, carrying-out can include initiating, executing, instantiating, implementing, accomplishing, enacting, or otherwise performing the data management operation. Carrying-out the data management operation may include configuring the data maturity engine to perform the data management operation with respect to a particular set of IoT data. For instance, in response to identifying that a first set of IoT data is associated with a maturity factor below 30%, the data maturity engine may be configured to delete the first set of IoT data, ignore the set of IoT data, or decline to collect the first set of IoT data from the IoT device that collected it. In embodiments, carrying-out the data management operation may include configuring the data management engine to define a global IoT data management policy for all or a portion of the IoT environment, such that the IoT devices included in a specified area are instructed to manage sets of IoT data having certain characteristics in a manner defined by the global IoT data management policy. As an example, in certain embodiments, the data maturity engine may define a global IoT data management policy for a first portion of the IoT environment that specifies that IoT data associated with a maturity factor between 40% and 80% is to be transmitted to a network storage device for temporary storage until the maturity factor exceeds 81% (e.g., at which point it is transferred to the data maturity engine for processing). In certain embodiments, the data maturity engine may be configured to specify a plurality of global IoT data management policies for different portions of the IoT environment, particular IoT devices, or particular types of IoT data, such that an appropriate data management operation may be performed with respect to the IoT data in an automated fashion. Other methods of carrying-out the data management operation to manage the set of IoT data are also possible.

Consider the following example. An IoT environment may include a plurality of sensors configured to monitor the concentration of nitrate per liter of water in a fish tank at an aquarium (e.g., fish cannot process nitrate, and concentrations of nitrate greater than 10 milligrams per liter may be associated with negative impacts on living organisms). A first sensor of the plurality of sensors may collect a first set of IoT data that indicates a nitrate concentration of 8 milligrams per liter in the fish tank at the aquarium, a concentration that exceeds an average nitrate concentration threshold for the aquarium of 4 milligrams per liter. As described herein, a data maturity engine may be configured to determine a first set of maturity factors with respect to the first set of IoT data. In embodiments, the data maturity engine may compare the first set of IoT data to a set of maturity criterion, and ascertain a first set of maturity factors that indicates that IoT data reported by less than 3 independent sensors is considered to be immature (e.g., maturity factor of 49%, failing to achieve a threshold maturity of 70%). As such, a first data management operation to temporarily store the set of IoT data may be identified. In embodiments, the first data management operation may define that the first set of IoT data be stored for 24 hours (e.g., at which point it may be deleted) or until additional data is collected that can be used to corroborate the first set of IoT data. Accordingly, the data management operation may be performed to store the first set of IoT data. In certain embodiments, a second set of IoT data from a second sensor that indicates a nitrate concentration of 9 milligrams per liter and a third set of IoT data from a third sensor that indicates a nitrate concentration of 7 milligrams per liter may be collected by the data maturity engine. The first, second, and third sets of IoT data may be aggregated, and a second set of maturity factors for the first, second, and third sets of IoT data may be recomputed based on the set of maturity criteria. As the set of maturity criterion are now achieved (e.g., the IoT data is reported by 3 sensors), the second set of maturity factors may indicate that the first, second, and third sets of IoT data are mature (e.g., maturity factor of 83%, achieving the threshold maturity of 70%). In embodiments, the second set of maturity factors may be used to identify a second data management operation to immediately process the first, second, and third sets of data (e.g., to investigate whether the nitrate readings indicate a potential anomaly with respect to the aquarium). Other methods of IoT data maturity management are also possible.

Method 600 concludes at block 699. As described herein, aspects of method 600 relate to IoT data maturity management. Aspects of method 600 may provide performance or efficiency benefits related to IoT data maturity management. As an example, distinguishing between mature (e.g., valid) and immature (e.g., invalid) data may facilitate IoT device communication and IoT environment performance. Altogether, leveraging maturity information for a set of data received from IoT devices may be associated with benefits such as data reliability, data utility, and IoT network performance and efficiency. Aspects may save resources such as bandwidth, processing, or memory.

Figure 7:
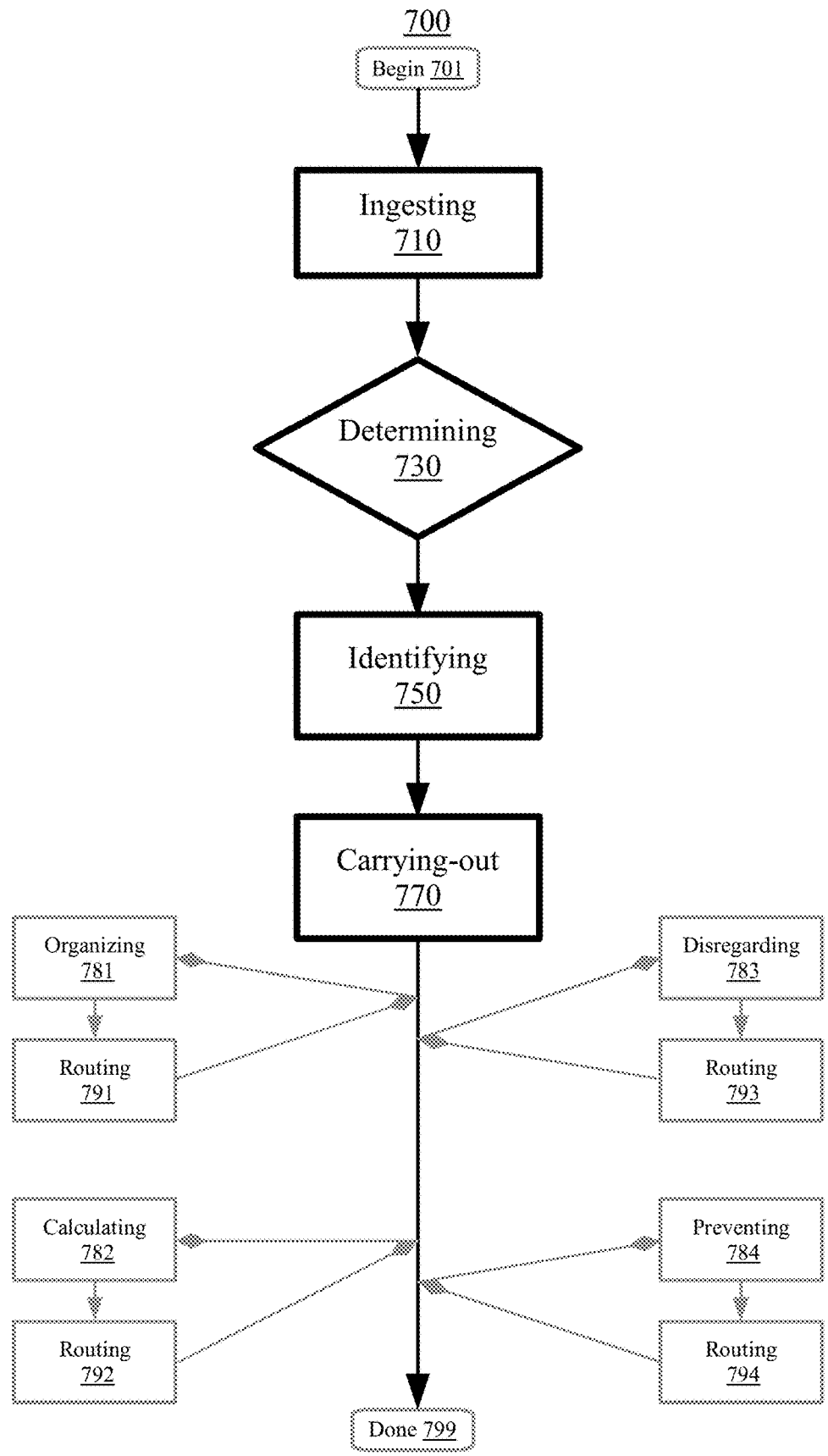
FIG. 7 is a flowchart illustrating a method of IoT data maturity management, according to embodiments.

FIG. 7 is a flowchart illustrating a method 700 of IoT data maturity management, according to embodiments. Aspects of method 700 relate to performing a data management operation to manage a set of IoT data. In embodiments, aspects of method 700 may be similar or the same as aspects of method 600, and aspects may be utilized interchangeably with one or more methodologies described herein. The method 700 may begin at block 701. At block 710, a set of IoT data may be ingested. The ingesting may be performed by a data maturity engine. At block 730, a set of maturity factors may be determined. The determining may occur with respect to the set of IoT data by the data maturity engine. The set of maturity factors may indicate a fitness for utilization of the set of IoT data by a data processing engine. At block 750, a data management operation may be identified. The identifying may be performed by the data maturity engine based on the set of maturity factors for the set of IoT data. The identifying may occur to manage the set of IoT data. At block 770, the data management operation may be carried-out. The carrying-out may be performed by the data maturity engine. The carrying-out may occur to manage the set of IoT data.

In embodiments, the set of IoT data may be organized at block 781. The organizing may occur based on the set of maturity factors. Aspects of the disclosure relate to the recognition that, in embodiments, the set of IoT data may be handled differently depending on the type/nature of the data, what it may be used for, what IoT device it was collected by, and other factors. Accordingly, aspects of the disclosure relate to organizing the set of IoT data. Generally, organizing can include sorting, ordering, combining, joining, categorizing, filtering, formatting, or otherwise arranging the set of IoT data. In embodiments, organizing the set of IoT data may include partitioning the IoT environment into a plurality of mutually exclusive sections based on the set of maturity factors (e.g., no overlap between IoT devices, such that no individual IoT device is a member of two sections at the same time). For instance, in embodiments, organizing the set of IoT data may include calculating a maturity factor that indicates a data maturity frequency (e.g., the rate at which data achieves maturity) for a set of IoT devices of the IoT environment, and subsequently partitioning the IoT environment such that IoT devices associated with data maturity frequencies that achieve a similarity threshold (e.g., fall within the same range) with respect to one another are grouped as part of the same partition (e.g., first subset of the set of IoT devices that achieve a first data maturity frequency threshold are grouped as a first network partition, second subset of the set of IoT devices that achieve a second data maturity threshold are grouped as a second network partition). In embodiments, organizing the set of IoT data may include sorting the set of IoT data based on a set of metadata tags associated with the set of data. As an example, a first set of IoT data associated with a metadata tag of "security camera footage" may be sorted into a first group, and a second set of IoT data associated with a metadata tag of "soil potassium concentration" may be sorted into a second group. In embodiments, the first and second groups may be analyzed by different devices, processed at different times, or undergo different data transformation operations (e.g., formatting, filtering, parsing). In embodiments, the set of IoT data may be routed at block 791. The set of IoT data may be routed to the data processing engine. Generally, routing can include transmitting, sending, conveying, directing, relaying, or otherwise transferring the set of IoT data to the data processing engine. The data processing engine may include a hardware component or software module configured to analyze, process, or otherwise manage the set of IoT data to derive meaning, extract inferences, make deductions, and form conclusions based on the set of IoT data. The data processing engine may be hosted by a central computing device (e.g., together with the data maturity engine) that is communicatively connected with the set of IoT devices. In embodiments, routing the set of IoT data may include analyzing the set of IoT data to ascertain an appropriate network communication protocol, structuring the set of IoT data according to the network communication protocol, and subsequently transmitting the set of IoT data to the data processing engine. Other methods of organizing the set of IoT data and routing the set of IoT data are also possible.

In embodiments, a set of IoT data elements may be calculated at block 782. The calculating may occur based on the set of maturity factors. The calculating may occur with respect to the set of IoT data. Generally, calculating can include formulating, estimating, deducing, measuring, inferring, forecasting, or otherwise computing the set of IoT data elements. The set of IoT data elements may include characteristics, properties, traits, or other attributes of the set of IoT data. In embodiments, calculating the set of IoT data elements may include interpolating (e.g., estimating) a set of IoT data elements that falls within the range of the set of IoT data. For example, for a set of IoT data that indicates temperature increase as a function of time and includes data points of "10.0° C. at 11:30 AM, 10.5° C. at 12:00 PM, 11.0° C. at 12:30 PM, and 12.0° C. at 1:00 PM", a data point of "11.5° C. at 12:00 PM" may be interpolated for the set of IoT data. In embodiments, calculating may include extrapolating (e.g., inferring) a set of IoT data elements that exceeds the range of captured data. For instance, with respect to the temperature and time data of the previous example, a data point of "14.0° C. at 3:00 PM" may be extrapolated for the set of IoT data. In embodiments, calculating the set of IoT data elements may include computing a substitute data element based on a set of historical IoT data. For instance, the substitute data element may be computed to take the place of (e.g., supersede) a missing data element of the set of IoT data elements. As an example, in response to determining that fuel economy statistics for a particular automobile are unavailable for a particular time period (e.g., data has been lost, was not collected), the fuel economy statistics for the same automobile at a previous time period (e.g., corresponding to the particular time period; same driving conditions, distance) may be computed to generate a set of substitute data elements for the particular automobile. In embodiments, the set of IoT data elements with respect to the set of IoT data may be routed at block 792. The set of IoT data elements may be routed to the data processing engine. Generally, routing can include transmitting, sending, conveying, directing, relaying, or otherwise transferring the set of IoT data to the data processing engine. As described herein, routing the set of IoT data may include analyzing the set of IoT data to ascertain an appropriate network communication protocol, structuring the set of IoT data according to the network communication protocol, and subsequently transmitting the set of IoT data to the data processing engine. Other methods of calculating the set of IoT data and routing the set of IoT data are also possible.

In embodiments, a first subset of the set of IoT data may be disregarded at block 783. The disregarding may occur based on the set of maturity factors. Aspects of the disclosure relate to the recognition that, in some embodiments, particular portions of the set of IoT data may not be valid or reliable for processing or utilization. Accordingly, aspects of the disclosure relate to disregarding a first subset of the set of IoT data based on the set of maturity factors. Generally, disregarding can include ignoring, deleting, neglecting, removing, filtering, discarding, or otherwise omitting the first subset of the set of IoT data. The first subset of the set of data may include a portion, segment, part, or piece of the set of IoT data. In embodiments, disregarding may include ascertaining that the set of maturity factors indicates that the first subset of the set of IoT data has not yet achieved a maturity threshold, and subsequently discarding the first subset of the set of data. For instance, a set of IoT data may include a first portion of IoT data that indicates illumination levels in an environment. The first portion of IoT data may be associated with a maturity factor of "46%," and fail to achieve a maturity threshold of "50%" (e.g., the illumination data is not stable/consistent enough for utilization or processing). Accordingly, the first subset of the set of IoT data may be deleted from the set of IoT data. In embodiments, disregarding may include ascertaining that the set of maturity factors indicates that the first subset of the set of IoT data achieves an expiration threshold (e.g., indicating old, invalid data), and subsequently removing the first subset of the set of data. As an example, a set of IoT data may include a first portion of IoT data that indicates pH levels in an aquarium. The first portion of IoT data may be associated with a maturity factor of "114%," and achieve an expiration threshold of "101%" (e.g., the pH data is associated with an old timestamp). Accordingly, the first subset of the set of IoT data may be filtered from the set of IoT data. In embodiments, a second subset of the set of IoT data may be routed at block 793. The second subset of the set of IoT data may be routed to the data processing engine. Generally, routing can include transmitting, sending, conveying, directing, relaying, or otherwise transferring the second subset of the set of IoT data to the data processing engine The second subset of the set of IoT data may include a portion, segment, part, or piece of the set of IoT data that is different from (e.g., mutually exclusive with respect to, does not overlap with) the first subset of the set of IoT data. In embodiments, a set of maturity factors for the second subset of the set of IoT data may indicate that the second subset of the set of IoT data achieves a maturity threshold. As described herein, routing the set of IoT data may include analyzing the set of IoT data to ascertain an appropriate network communication protocol, structuring the set of IoT data according to the network communication protocol, and subsequently transmitting the set of IoT data to the data processing engine. Other methods of disregarding the first subset of the set of IoT data and routing the second subset of the set of IoT data are also possible.

In embodiments, the set of IoT data may be prevented from being routed to the data processing engine at block 784. The preventing may occur based on both a staging threshold and the set of maturity factors. Generally, preventing can include storing, staging, holding, queuing, waiting, pausing, or otherwise delaying the set of IoT data from being routed to the data processing engine based on both the staging threshold and the set of maturity factors. The staging threshold may include a benchmark, stipulation, or requirement that indicates the amount and frequency with which sets of IoT data may be sent to the data processing engine (e.g., to reduce data contention and promote data maturity). For instance, the staging threshold may include a limitation that only 10 gigabytes of IoT data may be transmitted to the data processing engine every 5 minutes. In embodiments, preventing the set of IoT data from being routed may include temporarily storing at least a portion of the set of IoT data (e.g., in a network storage device, in a storage device of an IoT device) until both the staging threshold and a maturity threshold are achieved. In embodiments, preventing the set of IoT data from being routed may include enqueuing at least a portion of the set of IoT data in a first-in-first-out (FIFO) queue to be transmitted to the data processing engine in the order that it was received by the FIFO queue. In embodiments, the set of IoT data may be routed to the data processing engine at block 794. The routing may occur in response to achievement of the staging threshold by the set of maturity factors. Generally, routing can include transmitting, sending, conveying, directing, relaying, or otherwise transferring the set of IoT data to the data processing engine. In embodiments, routing may include ascertaining that the set of IoT data achieves both the staging threshold and the maturity threshold. As an example, consider that a staging threshold includes a limitation that only 7 gigabytes of IoT data may be transmitted to the data processing engine every 4 minutes, and that a maturity threshold indicates that only sets of IoT data that having a maturity factor of "90%" or greater may be routed to the data processing engine. Accordingly, a set of IoT data may be temporarily maintained in a storage queue until both the data processing engine is available to receive additional data and the maturity factor of the set of IoT data achieves 80% or greater (e.g., as a result of time elapsing, more data being collected), at which point the set of IoT data may be routed to the data processing engine. Other methods of preventing the set of IoT data from being routed to the processing engine and routing the set of IoT data in response to achievement of the staging threshold by the set of maturity factors are also possible.

Method 700 concludes at block 799. As described herein, aspects of method 700 relate to IoT data maturity management. Aspects of method 700 may provide performance or efficiency benefits related to IoT data maturity management. Altogether, leveraging maturity information for a set of data received from IoT devices may be associated with benefits such as data reliability, data utility, and IoT network performance and efficiency. Aspects may save resources such as bandwidth, processing, or memory.

Figure 8:
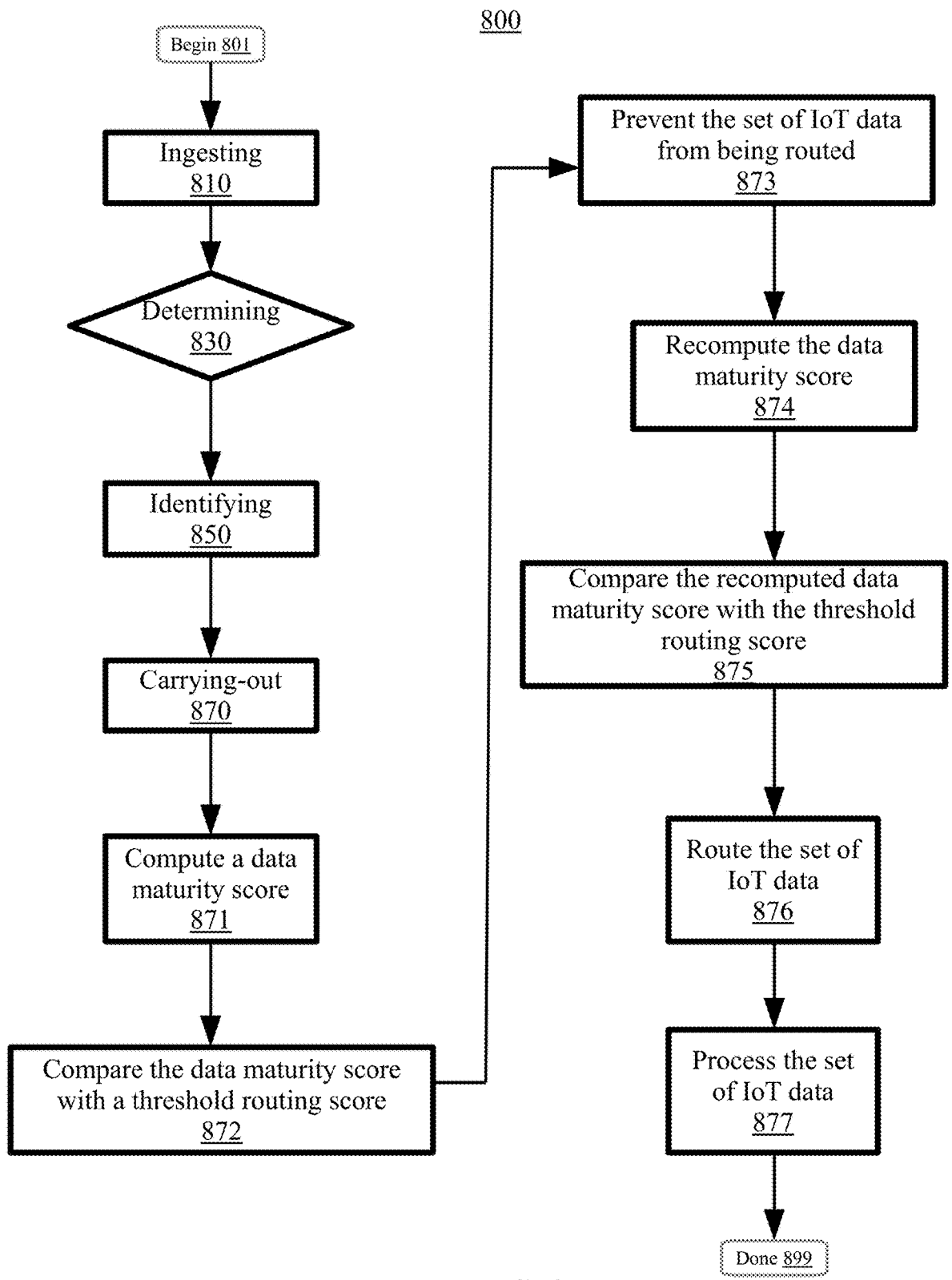
FIG. 8 is a flowchart illustrating a method of IoT data maturity management, according to embodiments.

FIG. 8 is a flowchart illustrating a method 800 of IoT data maturity management, according to embodiments. Aspects of method 800 may be similar or the same as aspects of method 600/700, and aspects may be utilized interchangeably with one or more methodologies described herein. The method 800 may begin at block 801. At block 810, a set of IoT data may be ingested. The ingesting may be performed by a data maturity engine. At block 830, a set of maturity factors may be determined. The determining may occur with respect to the set of IoT data by the data maturity engine. The set of maturity factors may indicate a fitness for utilization of the set of IoT data by a data processing engine. At block 850, a data management operation may be identified. The identifying may be performed by the data maturity engine based on the set of maturity factors for the set of IoT data. The identifying may occur to manage the set of IoT data. At block 870, the data management operation may be carried-out. The carrying-out may be performed by the data maturity engine. The carrying-out may occur to manage the set of IoT data.

At block 871, a data maturity score may be computed. The computing may occur with respect to the set of IoT data based on the set of maturity factors. Generally, computing can include formulating, estimating, deducing, measuring, inferring, forecasting, or otherwise calculating the data maturity score with respect to the set of IoT data based on the set of maturity factors. The data maturity score may include a quantitative indication of the validity, quality, integrity, reliability, or readiness of the set of IoT data. For instance, as described herein, the data maturity score may be expressed as a percentage, where a percentage of "100%" indicates complete maturity (e.g., ripeness, ready for processing/utilization), percentages less than 100% indicate that the set of IoT data is not yet mature (e.g., not yet ripe), and percentages greater than 100% indicate that the set of IoT data is overly mature (e.g., overripe, expired, past the point of utility). In embodiments, computing the data maturity score may include evaluating one or more characteristics (e.g., reception frequency, timestamp, data content, data amount) of the set of IoT data with respect to a set of reference data (e.g., mature set of data having characteristics that substantially correspond to the set of IoT data) and assigning a data maturity score to indicate the degree or extent of maturity of the set of IoT data as compared to the set of reference data. As an example, a set of IoT data that was collected 20 seconds ago may be compared with a set of reference data that was collected 120 seconds ago, and a maturity score of "16.7%" may be assigned to the set of IoT data (e.g., the set of reference data indicates that data is not considered mature until 120 seconds have elapsed since ingestion). Other methods of computing the data maturity score are also possible.

At block 872, the data maturity score may be compared with a threshold routing score. Generally, comparing can include contrasting, analyzing, investigating, correlating, juxtaposing, or otherwise evaluating the data maturity score in parallel with the threshold routing score. The threshold routing score may include a quantitative indication of the border or limit between data that is allowed to be routed to the data processing engine and data that is prevented from being routed to the data processing engine. As an example, a threshold routing score of "75" may be used to allow IoT data having a data maturity score of 75% or greater to be routed to the data processing engine, while IoT data having a maturity score of less than 75% may be prevented from being routed to the data processing engine. In embodiments, comparing the data maturity score with the threshold routing score may include examining the magnitude of the maturity score with respect to the magnitude of the threshold routing score. As an example, a set of IoT data having a data maturity score of "63%" may be examined with respect to a threshold routing score of 75%. In embodiments, the set of IoT data may be prevented from being routed to the data processing engine at block 873. The preventing may occur based on the threshold routing score exceeding the data maturity score. Generally, preventing can include storing, staging, holding, queuing, waiting, pausing, or otherwise delaying the set of IoT data from being routed to the data processing engine based on the threshold routing score exceeding the data maturity score. For instance, with reference to the previous example in which the set of IoT data having a data maturity score of "63%" is compared with the threshold routing score of 75%, it may be ascertained that the threshold routing score exceeds the data maturity score (e.g., the data maturity score fails to achieve the threshold routing score). Accordingly, the set of IoT data may be stored within a network storage device, a storage queue, or other storage device and preventing from being transferred to the data processing engine. Other methods of comparing the data maturity score with the threshold routing score and preventing the set of IoT data from being routed to the data processing engine are also possible.

At block 874, the data maturity score may be recomputed. The recomputing may occur with respect to the set of IoT data based on the set of maturity factors. Aspects of the disclosure relate to the recognition that, in some embodiments, a set of IoT data that has not achieved maturity at an initial time may achieve maturity at a later time (e.g., after more time has elapsed, more data has been collected). Accordingly, aspects of the disclosure relate to recomputing the maturity score for the set of IoT data. Generally, recomputing can include formulating, estimating, deducing, measuring, inferring, forecasting, or otherwise calculating the data maturity score with respect to the set of IoT data based on the set of maturity factors. In embodiments, recomputing the maturity score for the set of IoT data may include ascertaining that a predetermined time period (e.g., 30 seconds, 1 minute, 5 minutes, 1 hour) has elapsed since computation of the data maturity score, and subsequently re-evaluating the set of IoT data with respect to the set of reference data to formulate a new (e.g., second) maturity score for the set of IoT data. In embodiments, recomputing the maturity score may include ascertaining that a threshold data amount (e.g., 1 gigabyte of new data, 200 new data points) has been collected with respect to the set of IoT data, and subsequently re-evaluating the set of IoT data to generate an updated data maturity score. As an example, with respect to the set of IoT data of the previous example having a data maturity score of "63%," it may be determined that a predetermined time period of 5 minutes have elapsed since computation of the data maturity score. Accordingly, the set of IoT data may be re-evaluated, and an updated data maturity score of "81%" may be calculated for the set of IoT data. In embodiments, the recomputed data maturity score may be compared with the threshold routing score at block 875. Generally, comparing can include contrasting, analyzing, investigating, correlating, juxtaposing, or otherwise evaluating the recomputed data maturity score in parallel with the threshold routing score. For instance, with reference to the previous example, the recomputed data maturity score of "81%" may be examined with respect to the threshold routing score of "75." Other methods of recomputing the data maturity score and comparing the recomputed data maturity score with the threshold routing score are also possible.

At block 876, the set of IoT data may be routed to the data processing engine. The routing may occur based on the recomputed data maturity score exceeding the threshold routing score. Generally, routing can include transmitting, sending, conveying, directing, relaying, or otherwise transferring the set of IoT data to the data processing engine. In embodiments, routing the set of IoT data may be performed in response to determining that the recomputed data maturity score exceeds the threshold routing score. For example, in response to determining that the recomputed data maturity score of "81%" exceeds the threshold routing score of "75," the set of IoT data may be transmitted to the data processing engine. In embodiments, the set of IoT data may be processed by the data processing engine at block 877. The processing may occur based on the set of maturity factors. Generally, processing can include analyzing, investigating, handling, examining, evaluating, or otherwise performing one or more operations on the set of IoT data based on the set of maturity factors. In embodiments, processing the set of IoT data may include utilizing the data processing engine to derive meaning, extract inferences, make deductions, or form conclusions based on the set of IoT data. In embodiments, processing the set of IoT data may include using one or more data analysis methods including natural language processing (e.g., part-of-speech tagging, named entity recognition, parsing, relationship extraction, sentiment analysis), predictive modeling (e.g., support vector machines, logistics regression, majority classifiers), image analysis (e.g., image segmentation, motion detection, optical flow), statistical analysis (e.g., variance analysis, correlation, regression analysis, time series analysis), machine learning (e.g., deep learning, artificial neural networks, Bayesian networks, rule-based machine learning), or other types of techniques to derive meaning from the set of IoT data. Other methods of routing the set of IoT data to the data processing engine and processing the set of IoT data are also possible.

Method 800 concludes at block 899. As described herein, aspects of method 800 relate to IoT data maturity management. Aspects of method 800 may provide performance or efficiency benefits related to IoT data maturity management. Aspects may save resources such as bandwidth, processing, or memory. Altogether, leveraging maturity information for a set of data received from IoT devices may be associated with benefits such as data reliability, data utility, and IoT network performance and efficiency.

Figure 9:
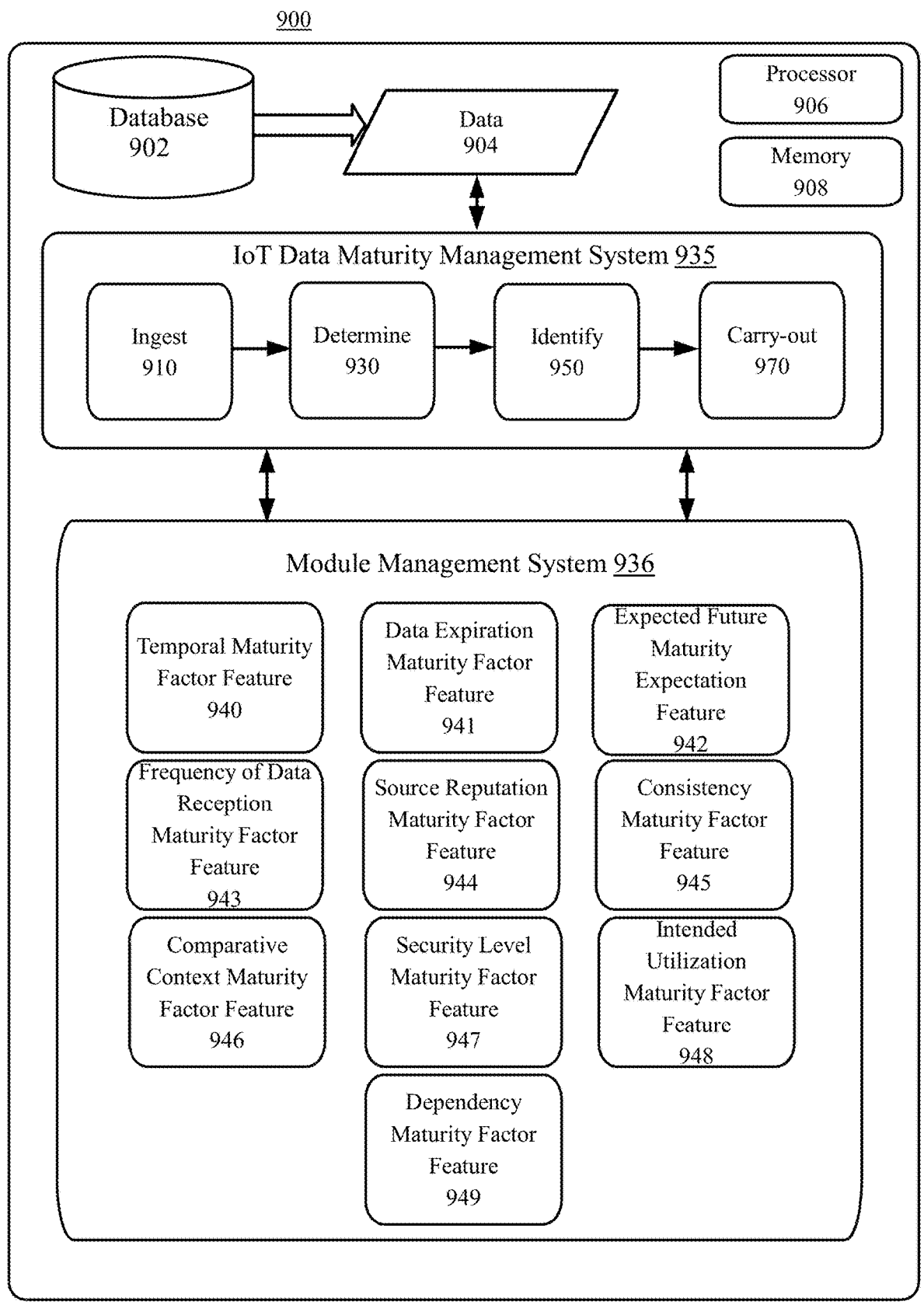
FIG. 9 depicts an example system of IoT data maturity management, according to embodiments.

FIG. 9 depicts an example system 900 of IoT data maturity management, according to embodiments. The example system 900 may include a processor 906 and a memory 908 to facilitate implementation of IoT data maturity management. The example system 900 may include a database 902 configured to maintain data used for stream application management. In embodiments, the example system 900 may include an IoT data maturity management system 935. The IoT data maturity management system 935 may be communicatively connected to the database 902, and be configured to receive data 904 (e.g., instructions, requests, data management operation commands) related to IoT data maturity management. The IoT data maturity management system 935 may include an ingesting module 910 to ingested a set of IoT data, a determining module 930 to determine a set of maturity factors, an identifying module 950 to identify a data management operation, and a carrying-out module 970 to carry-out the data management operation. The IoT data maturity management system 935 may be communicatively connected with a module management system 936 that includes a set of modules for implementing aspects of IoT data maturity management.

In embodiments, a temporal maturity factor feature may be ascertained at module 940. The ascertaining may occur with respect to the set of IoT data by the data maturity engine. Generally, ascertaining can include computing, formulating, detecting, calculating, resolving, identifying, or otherwise determining the temporal maturity factor feature. The temporal maturity factor feature may include a parameter, criterion, or characteristic that indicates a temporal (e.g., time-related) condition for evaluating the maturity of the set of IoT data. For instance, the temporal maturity factor feature may indicate a specified point in time or time frame (e.g., 3:33 PM, between 4 and 6 PM), a predetermined time period since IoT data collection/ingestion (e.g., 5 minutes, 1 hour, 24 hours), a latency threshold (e.g., no more than 25 milliseconds of latency), time from/to a particular event (e.g., 10 minutes until new data is received), or other time-related benchmark for evaluating the maturity of the set of IoT data. For instance, the temporal maturity factor feature may indicate that a set of IoT data indicating blood pressure values for a patient may be considered to be mature 10 minutes after the patient has entered a resting state (e.g., so that blood pressure data is not affected by previous patient activity). As another example, the temporal maturity factor feature may indicate that traffic congestion values for a road are only valid between a time frame of 5:00 PM and 7:00 PM (e.g., to capture rush hour traffic statistics). In embodiments, the data management operation may be selected to manage the set of IoT data based on the temporal maturity factor feature. Generally, selecting the data management operation may include choosing, picking, ascertaining, electing, nominating, identifying, or otherwise determining the data management operation. In embodiments, selecting the data management operation may include identifying a data management operation based on the degree of maturity of the set of IoT data (e.g., disregarding expired data, temporarily storing immature data, promptly processing mature data). Other methods of ascertaining the temporal maturity factor feature and selecting the data management operation based on the temporal maturity factor feature are also possible.

In embodiments, a data expiration maturity factor feature may be ascertained (computed, formulated, detected, calculated, resolved, identified, determined) at module 941. The ascertaining may occur with respect to the set of IoT data by the data maturity engine. The data expiration maturity factor may include a parameter, criterion, or characteristic that defines a condition under which the set of IoT data is considered to be expired (e.g., no longer valid, less useful). For instance, the data expiration maturity factor feature may include a particular point in time (e.g., 7:10 AM), triggering event (e.g., detection of movement, detection of new data), or attribute of the set of IoT data (e.g., IoT data containing a certain value) that indicates that the set of IoT data is expired. As an example, the data expiration maturity factor feature may indicate that a set of IoT data related to temperature measurements for the central processing unit (CPU) of a computer are considered to be expired after a particular computing task has been migrated to another processor (e.g., temperature values measured afterward do not characterize the thermal properties of the CPU under a particular workload). As another example, the data expiration maturity factor feature may indicate that a set of IoT data indicating characteristics of the facial expression of a user (e.g., gaze duration, eye movement, mouth angle) are considered to be expired after an image/video clip (e.g., advertisement) viewed by the user has changed (e.g., facial expression data after the image/video clip change does not characterize the feelings/sentiment of the user with respect to the image/video clip). In embodiments, the data management operation may be selected (e.g., chosen, picked, ascertained, elected, nominated, identified, determined) to manage the set of IoT data based on the data expiration maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the data expiration maturity factor feature and selecting the data management operation based on the data expiration maturity factor feature are also possible.

In embodiments, an expected future maturity factor feature may be ascertained (computed, formulated, detected, calculated, resolved, identified, determined) at module 942. The ascertaining may occur with respect to the set of IoT data by the data maturity engine. The expected future maturity factor may include a parameter, criterion, or characteristic that defines a condition under which a set of IoT data is predicted (e.g., forecasted, computed, estimated) to become mature. For instance, the expected future maturity factor feature may include a particular point in time (e.g., 10:15 AM), triggering event (e.g., reception of additional data), or condition (e.g., bank account achieves a certain balance) that indicates that the set of IoT data is mature. As an example, the expected future maturity factor may indicate that a set of IoT data related to the fuel economy of a vehicle is considered to be mature once the vehicle achieves a particular speed (e.g., expected vehicle fuel economy may vary based on the speed of the vehicle). As another example, the expected future maturity factor may indicate that a set of IoT data related to the electricity usage of a metropolitan area is considered to be mature after 8:30 AM (e.g., after the "morning ramp" in electricity usage). In embodiments, the data management operation may be selected (e.g., chosen, picked, ascertained, elected, nominated, identified, determined) to manage the set of IoT data based on the expected future maturity expectation feature. In embodiments, selecting the data management operation may include identifying a data management operation based on the degree of maturity of the set of IoT data (e.g., disregarding expired data, temporarily storing immature data, promptly processing mature data). Other methods of ascertaining the expected future maturity expectation feature and selecting the data management operation based on the expected future maturity expectation feature are also possible.

In embodiments, a frequency of data reception maturity factor feature may be ascertained (computed, formulated, detected, calculated, resolved, identified, determined) at module 943. The ascertaining may occur with respect to the set of IoT data by the data maturity engine. The frequency of data reception maturity factor feature may include a parameter, criterion, or characteristic that defines a data reception frequency-related condition (e.g., how often data is received) for evaluating the maturity of the set of IoT data. For instance, the frequency of data reception maturity factor feature may specify an IoT data reception rate (e.g., amount of data received per unit time; 1 gigabyte per second) an IoT data reception periodicity (e.g., time intervals at which IoT data is received; every 2 minutes, once per hour, once every 4 hours), a forecast of when a next set of IoT data is expected to be received (e.g., at 2:30 PM, in 40 seconds) or other parameter that may be used to evaluate IoT data maturity. As an example, the frequency of data reception maturity factor feature may indicate that a set of IoT data related to the quality of air (e.g., concentration of particulates in the air) is considered mature if a frequency threshold of 20 measurements per hour is achieved (e.g., data measurements less frequent than 20 per hour may not constitute a representative sample). As another example, the frequency of data reception maturity factor feature may indicate that a set of IoT data related to network data traffic is considered mature if a data capture threshold rate of 500 megabytes per second is achieved (e.g., less than 500 megabytes per second may not be sufficient to characterize the data flow patterns of the network data). In embodiments, the data management operation may be selected (e.g., chosen, picked, ascertained, elected, nominated, identified, determined) to manage the set of IoT data based on the frequency of data reception maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the frequency of data reception maturity factor feature and selecting the data management operation based on the frequency of data reception maturity factor feature are also possible.

In embodiments, a source reputation maturity factor feature may be ascertained at module 944. The ascertaining may occur with respect to the set of IoT data by the data maturity engine. The source reputation maturity factor feature may include a parameter, characteristic, or condition of an IoT data source (e.g., IoT device, sensor, individual, data sample) that defines a criterion for evaluating the maturity of the set of IoT data based on the trustworthy, suitability, integrity, or reliability of the IoT data source. For instance, the source reputation maturity factor feature may include a historical reliability score for a data source (e.g., how accurate/reliable has data from the data source been in the past), a data source wear level (e.g., degree or extent of IoT device usage, how new/old is the data source), a hazard function index (e.g., point on a bathtub curve indicating the likelihood of the device to be affected by early life-cycle failures, mid life-cycle random failures, and late life-cycle wear-out failures), or other parameter that may be used to evaluate IoT data maturity based on the reliability of the IoT data source. As an example, the source reputation maturity factor feature may indicate that data is considered to be mature when received by IoT data sources that have been in use/service for at least 500 hours (e.g., brand-new devices/sensors may not yet be correctly calibrated, while older devices may be more prone to mistaken measurements). In certain embodiments, the source reputation maturity factor feature may indicate that IoT data is considered to be mature if it is received by a data source having a historical reliability score above a threshold. For instance, a set of IoT data collected by a first IoT device may be considered to be mature if past measurements collected by the first IoT device have been verified to achieve an accuracy of 90% (e.g., signifying that the first IoT device is trustworthy/reliable). In embodiments, the data management operation may be selected (e.g., chosen, picked, ascertained, elected, nominated, identified, determined) to manage the set of IoT data based on the source reputation maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the source reputation maturity factor feature and selecting the data management operation based on the source reputation maturity factor feature are also possible.

In embodiments, a consistency maturity factor feature may be ascertained at module 945. The ascertaining may occur with respect to the set of IoT data by the data maturity engine. The data management operation may be selected to manage the set of IoT data based on the consistency maturity factor feature. The consistency maturity factor feature may include a parameter, criterion, or characteristic of the set of IoT data that defines a condition for evaluating the maturity of the set of IoT data based on the consistency (e.g., steadiness, uniformity, stability, constancy, regularity) of the set of IoT data. For instance, the consistency maturity factor feature may indicate a variability tolerance level for the set of IoT data (e.g., accepted degree of fluctuation; no more than 25% difference between highest and lowest value for a particular measurement), a data reception frequency fluctuation threshold (e.g., defined regularity or periodicity of IoT data collection/reception), IoT data agreement criterion (e.g., data values fall within an expected range) or the like. As an example, the consistency maturity factor feature may indicate that a set of IoT data related to barometric pressure values for a particular region are considered mature if there is less than a 10% difference between the highest barometric pressure measurement and the lowest barometric pressure measurement for a particular time (e.g., greater fluctuation may indicate incorrect device calibration). As another example, the consistency maturity factor feature may indicate that IoT data measurements are considered to be mature provided that the measurements are collected no more than 30 seconds apart (e.g., greater variability may not allow for collection of a representative sample). In embodiments, the data management operation may be selected (e.g., chosen, picked, ascertained, elected, nominated, identified, determined) to manage the set of IoT data based on the consistency maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the consistency maturity factor feature and selecting the data management operation based on the consistency maturity factor feature are also possible.

In embodiments, a comparative context maturity factor feature may be ascertained at module 946. The ascertaining may occur with respect to the set of IoT data by the data maturity engine. The comparative context maturity factor feature may include a parameter, criterion, or characteristic that defines a condition for evaluating the maturity of the set of IoT data based on the context (e.g., background information, agreement with previous collected data or established circumstances) for the set of IoT data. For instance, the comparative context maturity factor feature may specify an IoT data source correspondence criterion (e.g., degree or extent to which a set of IoT data agrees/matches data captured by other IoT data sources), an IoT data logical consistency parameter (e.g., degree or extent to which a set of IoT data is logically consistent with respect to a set of established facts, circumstances, principles, or axioms), or the like. As an example, consider that a first set of IoT data indicates that transactions (e.g., money transfers) are being processed by a server for a bank at a rate of 15 transactions per minute, however a second, third, and fourth set of IoT data from independent IoT devices all indicate that the servers for the bank are currently down for maintenance. Accordingly, the first set of IoT data may be determined to be immature (e.g., the first set of IoT data does not match the context reported by other IoT devices). As another example, a first set of IoT data may indicate that snow is falling at a rate of 0.6 inches per hour with respect to a particular region, however a second set of IoT data collected by a second IoT device may indicate that the current temperature for the particular region is 79° Fahrenheit (e.g., a temperature at which snowfall is highly unlikely). Accordingly, the first set of IoT data may be determined to be immature as it does not match the context indicated by other IoT devices. In embodiments, the data management operation may be selected (e.g., chosen, picked, ascertained, elected, nominated, identified, determined) to manage the set of IoT data based on the comparative context maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the comparative context maturity factor feature and selecting the data management operation based on the comparative context maturity factor feature are also possible.

In embodiments, a security level maturity factor feature may be ascertained at module 947. The ascertaining may occur with respect to the set of IoT data by the data maturity engine. The security level maturity factor feature may include a parameter, criterion, or characteristic that defines a condition for evaluating the maturity of the set of IoT data based on the security level of the set of IoT data. For instance, the security level maturity factor feature may include an encryption protocol parameter (e.g., type, safety features, degree of protection provided by the encryption of the set of IoT data), an IoT data trust factor (e.g., observing the IoT data for a threshold time period to verify that viruses, Trojans, or other security vulnerabilities are not present), an IoT data sensitivity criterion (e.g., validation that personal/classified information has been removed from the set of IoT data prior to processing/utilization). As an example, the security level maturity factor feature may indicate that a set of IoT data regarding financial transactions for a user is considered to be mature after a redaction operation has been performed to remove names, bank account numbers, and other personal information from the set of IoT data. As another example, the security level maturity factor feature may indicate that a set of IoT data regarding unreleased product designs is considered to be mature if it is encrypted using a particular encryption algorithm (e.g., public-key cryptography, symmetric-key cryptography, cryptographic hash function, one-time pad). In embodiments, the data management operation may be selected (e.g., chosen, picked, ascertained, elected, nominated, identified, determined) to manage the set of IoT data based on the security level maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the security level maturity factor feature and selecting the data management operation based on the security level maturity factor feature are also possible.

In embodiments, an intended utilization maturity factor feature may be ascertained at module 948. The ascertaining may occur with respect to the set of IoT data by the data maturity engine. The intended utilization maturity factor feature may include a parameter, condition, or characteristic that defines a criterion for evaluating the maturity of the set of IoT data based on the intended utilization (e.g., purpose, utility) of the set of IoT data. For instance, the intended utilization maturity factor feature may include a utilization maturity index that defines a set of criteria for assessing the maturity of the set of IoT data with respect to a plurality of potential uses (e.g., particular sets of IoT data may be considered to be mature for some uses, but not mature for others). As an example, the utilization maturity index may specify that a set of IoT data related to the velocity, altitude, and weather conditions for an aircraft is mature (e.g., valid) with respect to a usage of calculating the expected arrival time of the aircraft, but not mature with respect to a usage of flight control mapping (e.g., designating aircraft flight paths to prevent incidents). As another example, the utilization maturity index may specify that a set of IoT data related to bridge load/stress testing is mature with respect to a usage of estimating a maximum safe load for the bridge, but is not mature with respect to determining potential modes of failure (e.g., possible breaking points) for the bridge. In embodiments, the data management operation may be selected (e.g., chosen, picked, ascertained, elected, nominated, identified, determined) to manage the set of IoT data based on the intended utilization maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the intended utilization maturity factor feature and selecting the data management operation based on the intended utilization maturity factor feature are also possible.

In embodiments, a dependency maturity factor feature may be ascertained at module 949. The ascertaining may occur with respect to the set of IoT data by the data maturity engine. The dependency maturity factor feature may include a parameter, condition, or characteristic that defines a criterion for evaluating the maturity of the set of IoT data based on the relationship between the set of IoT data and other data (e.g., other sets of IoT data, previously collected data). In embodiments, the dependency maturity factor feature may define an IoT data reliance factor (e.g., extent or degree to which a set of IoT data depends, relies, or is contingent upon another portion of data), an IoT data impact parameter (e.g., extent or degree to which the set of IoT data affects or influences other sets of IoT data), an IoT data priority level (e.g., relative degree of importance, significance, or severity of the set of IoT data with respect to other sets of IoT data), or the like. As an example, a first set of IoT data related to the pH of soil in a particular region may not be considered to be mature unless the first set of IoT data is coupled with a second set of IoT data indicating the precipitation amount and frequency for the area (e.g., the pH of soil may be significantly affected by rainfall). In embodiments, the data management operation may be selected (e.g., chosen, picked, ascertained, elected, nominated, identified, determined) to manage the set of IoT data based on the dependency maturity factor feature. In embodiments, selecting the data management operation may include identifying a data management operation based on the degree of maturity of the set of IoT data (e.g., disregarding expired data, temporarily storing immature data, promptly processing mature data). Other methods of ascertaining the dependency maturity factor feature and selecting the data management operation based on the dependency maturity factor feature are also possible.

Figure 10:
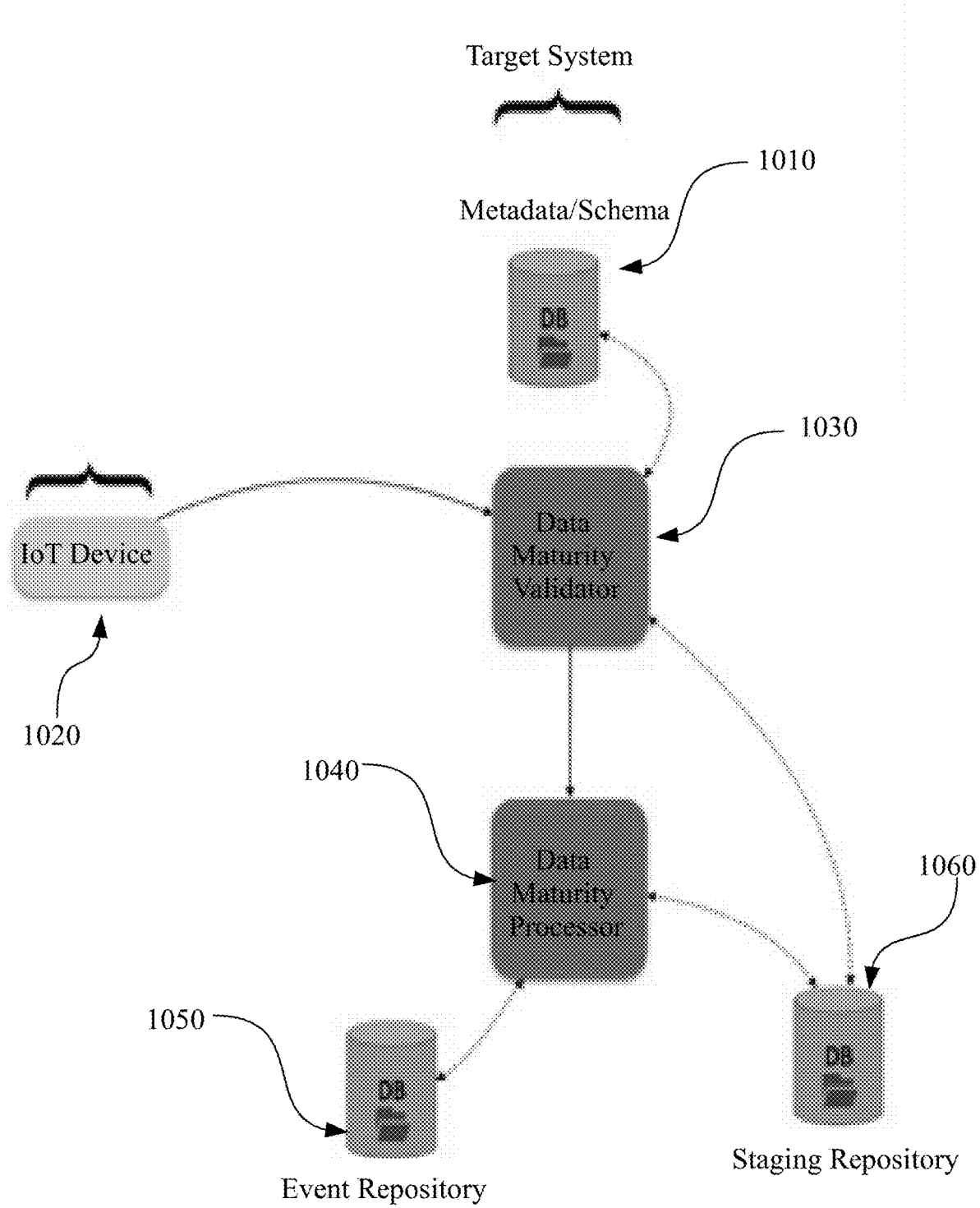
FIG. 10 depicts an example high-level system architecture of IoT data maturity management, according to embodiments.

FIG. 10 depicts an example high-level system architecture 1000 of IoT data maturity management, according to embodiments. Aspects of the high-level system architecture 1000 relate to validating the maturity of a set of IoT data, and performing a data management operation based on the degree of maturity of the set of IoT data. As shown in FIG. 10, the high-level system architecture 1000 may include a data maturity validator 1030 configured to receive a set of IoT data from an IoT device 1020 (e.g., sensor) and evaluate it with respect to a set of metadata 1010 (e.g., timestamp, frequency, security level, consistency, source device reputation) to ascertain the degree of completeness, integrity, trustworthiness, or reliability of the set of IoT data. In embodiments, the data maturity validator 1030 may be configured to invoke a data maturity processor 1040 to analyze event history and usage patterns stored on event repository 1050 to evaluate if the IoT device 1020 that captured the set of IoT data may be trusted. In the event that the IoT device 1020 is determined to be untrustworthy (e.g., based on errors/inaccuracies in historical data) the set of IoT data may be determined to be immature (e.g., and subsequently disregarded, discarded, or temporarily stored). In the event that the IoT device 1020 is determined to be trustworthy, the set of IoT data may be determined to be mature. In embodiments, the data maturity validator 1030 may be configured to use an internal function defined by the class or type of the IoT device 1020 to ascertain whether or not the set of IoT data is mature (e.g., ready) enough for use. In the event that the set of IoT data is determined to be immature, the set of IoT data may be stored on a staging repository 1060 until it becomes mature (e.g., as the result of additional data collection, time elapsing, a triggering event, or the like). In the event that the set of IoT data is determined to be mature (e.g., or becomes mature) the set of IoT data may be transmitted to the data maturity processor 1040 for analysis. Other methods of IoT data maturity management are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of Internet of Things (IoT) data maturity management, the method comprising:
   receiving, by a data maturity engine, a set of IoT data from an IoT device;
   evaluating, by the data maturity engine, the set of IoT data with respect to a set of maturity factors to ascertain a degree of trustworthiness for the set of IoT data, wherein the set of maturity factors includes an indication of integrity of the set of IoT data;
   ascertaining, with respect to the set of IoT data by the data maturity engine, a source reputation maturity factor feature and a security level maturity factor feature, wherein the source reputation maturity factor feature includes a historical reliability score for a data source, wherein the security level maturity factor feature includes an encryption protocol parameter, an IoT data trust factor, and an IoT data sensitivity criterion;
   selecting, based on the source reputation maturity factor feature and the security level maturity factor feature, a first data management operation to manage the set of IoT data;
   carrying-out, by the data maturity engine, the first data management operation to manage the set of IoT data;
   computing, with respect to the set of IoT data with the first data management operation based on the set of maturity factors, a data maturity score;
   comparing the data maturity score with a threshold routing score;
   routing, to the data processing engine based on the data maturity score exceeding the threshold routing score, the set of IoT data with the first data management operation; and
   processing, by the data processing engine based on the set of maturity factors, the set of IoT data with the first data management operation utilizing one or more data analysis methods.

2. The method of claim 1, further comprising:
   organizing, based on the set of maturity factors, the set of IoT data; and
   routing, to a data processing engine, the set of IoT data.

3. The method of claim 1, further comprising:
   calculating, based on the set of maturity factors, a set of IoT data elements with respect to the set of IoT data; and
   routing, to a data processing engine, the set of IoT data elements with respect to the set of IoT data.

4. The method of claim 1, further comprising:
   ascertaining, with respect to the set of IoT data by the data maturity engine, a temporal maturity factor feature, wherein the temporal maturity factor feature is a parameter indicating a time-related condition for evaluating the maturity of the set of IoT data;
   selecting, based on the temporal maturity factor feature, a second data management operation to manage the set of IoT data; impeded
   carrying-out, by the data maturity engine, the second data management operation to manage the set of IoT data.

5. The method of claim 1, further comprising:
   ascertaining, with respect to the set of IoT data by the data maturity engine, a data expiration maturity factor feature, wherein the data expiration maturity factor feature is a parameter defining a condition under which the set of IoT data is considered to be expired;
   selecting, based on the data expiration maturity factor feature, a second data management operation to manage the set of IoT data;
   carrying-out, by the data maturity engine, the second data management operation to manage the set of IoT data.

6. The method of claim 1, further comprising:
   ascertaining, with respect to the set of IoT data by the data maturity engine, an expected future maturity expectation feature;
   selecting, based on the expected future maturity expectation feature, a second data management operation to manage the set of IoT data;
   carrying-out, by the data maturity engine, the second data management operation to manage the set of IoT data.

7. The method of claim 1, further comprising:
   ascertaining, with respect to the set of IoT data by the data maturity engine, a frequency of data reception maturity factor feature, wherein the frequency of data reception maturity factor feature defines a data reception frequency-related condition for evaluating the maturity of the set of IoT data and includes a forecast of when a next set of IoT data is expected to be received;

selecting, based on the frequency of data reception maturity factor feature, a second data management operation to manage the set of IoT data;

carrying-out, by the data maturity engine, the second data management operation to manage the set of IoT data.

8. The method of claim 1, further comprising:

ascertaining, with respect to the set of IoT data by the data maturity engine, a consistency maturity factor feature, wherein the consistency maturity feature factor defines a condition for evaluating the maturity of the set of IoT data based on the consistency of the set of IoT data;

selecting, based on the consistency maturity factor feature, a second data management operation to manage the set of IoT data;

carrying-out, by the data maturity engine, the second data management operation to manage the set of IoT data.

9. The method of claim 1, further comprising:

ascertaining, with respect to the set of IoT data by the data maturity engine, a comparative context maturity factor feature, wherein the comparative context maturity factor species an IoT data source correspondence criterion and an IoT data logical consistency parameter;

selecting, based on the comparative context maturity factor feature, a second data management operation to manage the set of IoT data;

carrying-out, by the data maturity engine, the second data management operation to manage the set of IoT data.

10. The method of claim 1, further comprising:

ascertaining, with respect to the set of IoT data by the data maturity engine, an intended utilization maturity factor feature;

selecting, based on the intended utilization maturity factor feature, a second data management operation to manage the set of IoT data;

carrying-out, by the data maturity engine, the second data management operation to manage the set of IoT data.

11. The method of claim 1, further comprising:

ascertaining, with respect to the set of IoT data by the data maturity engine, a dependency maturity factor feature, wherein the dependency maturity factor feature defines an IoT data reliance factor, an IoT data impact parameter, and an IoT data priority level;

selecting, based on the dependency maturity factor feature, a second data management operation to manage the set of IoT data;

carrying-out, by the data maturity engine, the second data management operation to manage the set of IoT data.

12. A system of IoT data maturity management, the system comprising:

a memory having a set of computer readable computer instructions, and a processor for executing the set of computer readable instructions, the set of computer readable instructions including:

receiving, by a data maturity engine, a set of IoT data from an IoT device;

evaluating, by the data maturity engine, the set of IoT data with respect to a set of maturity factors to ascertain a degree of trustworthiness for the set of IoT data, wherein the set of maturity factors includes an indication of integrity of the set of IoT data;

ascertaining, with respect to the set of IoT data by the data maturity engine, a source reputation maturity factor feature and a security level maturity factor feature, wherein the source reputation maturity factor feature includes a historical reliability score for a data source, wherein the security level maturity factor feature includes an encryption protocol parameter, an IoT data trust factor, and an IoT data sensitivity criterion;

selecting, based on the source reputation maturity factor feature and the security level maturity factor feature, a first data management operation to manage the set of IoT data;

carrying-out, by the data maturity engine, the first data management operation to manage the set of IoT data;

computing, with respect to the set of IoT data with the first data management operation based on the set of maturity factors, a data maturity score;

comparing the data maturity score with a threshold routing score;

routing, to the data processing engine based on the data maturity score exceeding the threshold routing score, the set of IoT data with the first data management operation; and processing, by the data processing engine based on the set of maturity factors, the set of IoT data with the first data management operation utilizing one or more data analysis methods.

13. A computer program product of IoT data maturity management, the computer program product comprising a computer readable storage medium having program instructions embodied therewith, wherein the computer readable storage medium is not a transitory signal per se, the program instructions executable by a processor to cause the processor to perform a method comprising:

receiving, by a data maturity engine, a set of IoT data from an IoT device;

evaluating, by the data maturity engine, the set of IoT data with respect to a set of maturity factors to ascertain a degree of trustworthiness for the set of IoT data, wherein the set of maturity factors includes an indication of integrity of the set of IoT data;

ascertaining, with respect to the set of IoT data by the data maturity engine, a source reputation maturity factor feature and a security level maturity factor feature, wherein the source reputation maturity factor feature includes a historical reliability score for a data source, wherein the security level maturity factor feature includes an encryption protocol parameter, an IoT data trust factor, and an IoT data sensitivity criterion;

selecting, based on the source reputation maturity factor feature and the security level maturity factor feature, a first data management operation to manage the set of IoT data;

carrying-out, by the data maturity engine, the first data management operation to manage the set of IoT data;

computing, with respect to the set of IoT data with the first data management operation based on the set of maturity factors, a data maturity score;

comparing the data maturity score with a threshold routing score;

routing, to the data processing engine based on the data maturity score exceeding the threshold routing score, the set of IoT data with the first data management operation; and processing, by the data processing engine based on the set of maturity factors, the set of IoT data with the first data management operation utilizing one or more data analysis methods.

14. The computer program product of claim 13, the program instructions executable by the processor to cause the processor to perform the method further comprising:

organizing, based on the set of maturity factors, the set of IoT data; and routing, to a data processing engine, the set of IoT data.

15. The computer program product of claim 13, the program instructions executable by the processor to cause the processor to perform the method further comprising:

calculating, based on the set of maturity factors, a set of IoT data elements with respect to the set of IoT data; and routing, to a data processing engine, the set of IoT data elements with respect to the set of IoT data.

16. The computer program product of claim 13, the program instructions executable by the processor to cause the processor to perform the method further comprising:

ascertaining, with respect to the set of IoT data by the data maturity engine, a temporal maturity factor feature, wherein the temporal maturity factor feature is a parameter indicating a time-related condition for evaluating the maturity of the set of IoT data;

selecting, based on the temporal maturity factor feature, a second data management operation to manage the set of IoT data;

carrying-out, by the data maturity engine, the second data management operation to manage the set of IoT data.

17. The computer program product of claim 13, the program instructions executable by the processor to cause the processor to perform the method further comprising:

ascertaining, with respect to the set of IoT data by the data maturity engine, a data expiration maturity factor feature, wherein the data expiration maturity factor feature is a parameter defining a condition under which the set of IoT data is considered to be expired;

selecting, based on the data expiration maturity factor feature, a second data management operation to manage the set of IoT data;

carrying-out, by the data maturity engine, the second data management operation to manage the set of IoT data.

18. The computer program product of claim 13, the program instructions executable by the processor to cause the processor to perform the method further comprising:

ascertaining, with respect to the set of IoT data by the data maturity engine, an expected future maturity expectation feature;

selecting, based on the expected future maturity expectation feature, a second data management operation to manage the set of IoT data;

carrying-out, by the data maturity engine, the second data management operation to manage the set of IoT data.

* * * * *